United States Patent [19]

Allen

[11] 4,248,013
[45] Feb. 3, 1981

[54] HYDROPONIC BEDDING TRAY APPARATUS

[76] Inventor: Donavan J. Allen, Rt. 8, Box 287, Greer, S.C. 29651

[21] Appl. No.: 65,092

[22] Filed: Aug. 9, 1979

[51] Int. Cl.³ ..................... A01G 25/00; A01G 31/00
[52] U.S. Cl. ........................................... 47/59; 47/80
[58] Field of Search ............... 47/39, 48.5, 59, 60, 47/61, 62, 63, 64, 65, 79, 80, 81, 18

[56] References Cited

U.S. PATENT DOCUMENTS

| | | | |
|---|---|---|---|
| 1,130,203 | 3/1915 | Schreyer | 47/79 |
| 1,222,648 | 4/1917 | Marks | 47/80 |
| 1,773,020 | 8/1930 | Willis | 47/79 |
| 2,031,146 | 2/1936 | Dodge | 47/80 |
| 2,060,735 | 11/1936 | Krueger | 47/62 |
| 2,674,828 | 4/1954 | Tegner | 47/79 X |
| 2,713,752 | 7/1955 | Sobol | 47/80 |
| 2,855,725 | 10/1958 | Carothers | 47/62 X |
| 3,271,900 | 9/1966 | Mori | 47/80 |
| 3,552,058 | 1/1971 | Fici | 47/79 |
| 4,107,875 | 8/1978 | Bordine | 47/18 |

FOREIGN PATENT DOCUMENTS

| | | | |
|---|---|---|---|
| 971032 | 9/1964 | United Kingdom | 47/80 |
| 212661 | 2/1968 | U.S.S.R. | 47/81 |

*Primary Examiner*—Edgar S. Burr
*Assistant Examiner*—James R. Feyrer
*Attorney, Agent, or Firm*—Bailey, Dority & Flint

[57] ABSTRACT

A hydroponic bedding tray and nutrient feeding apparatus is disclosed which is particularly advantageous for outdoor use wherein trough means in fluid communication with a nutrient mixing reservoir are formed below a bottom floor of the bedding tray so that a plant contained in an inert media within the bedding tray is fed through capillary action and the bedding tray floor is sloped so as to avoid drainage into the trough means and dilution of the nutrient solution in the reservoir.

9 Claims, 5 Drawing Figures

U.S. Patent      Feb. 3, 1981      4,248,013
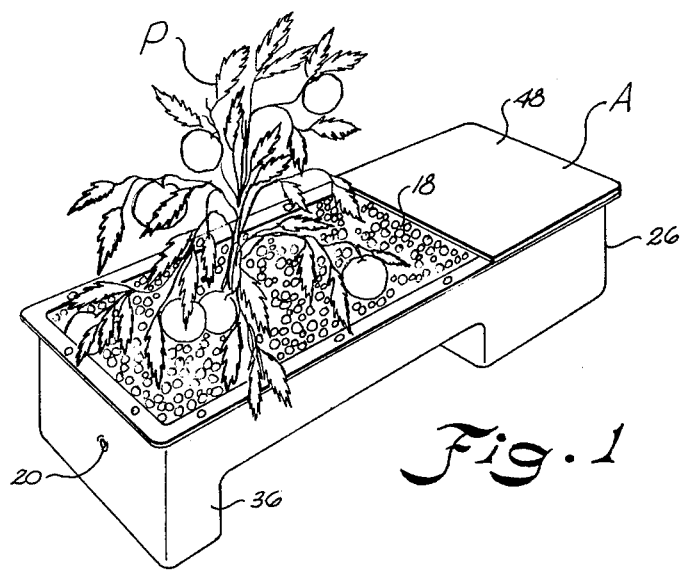
Fig. 1
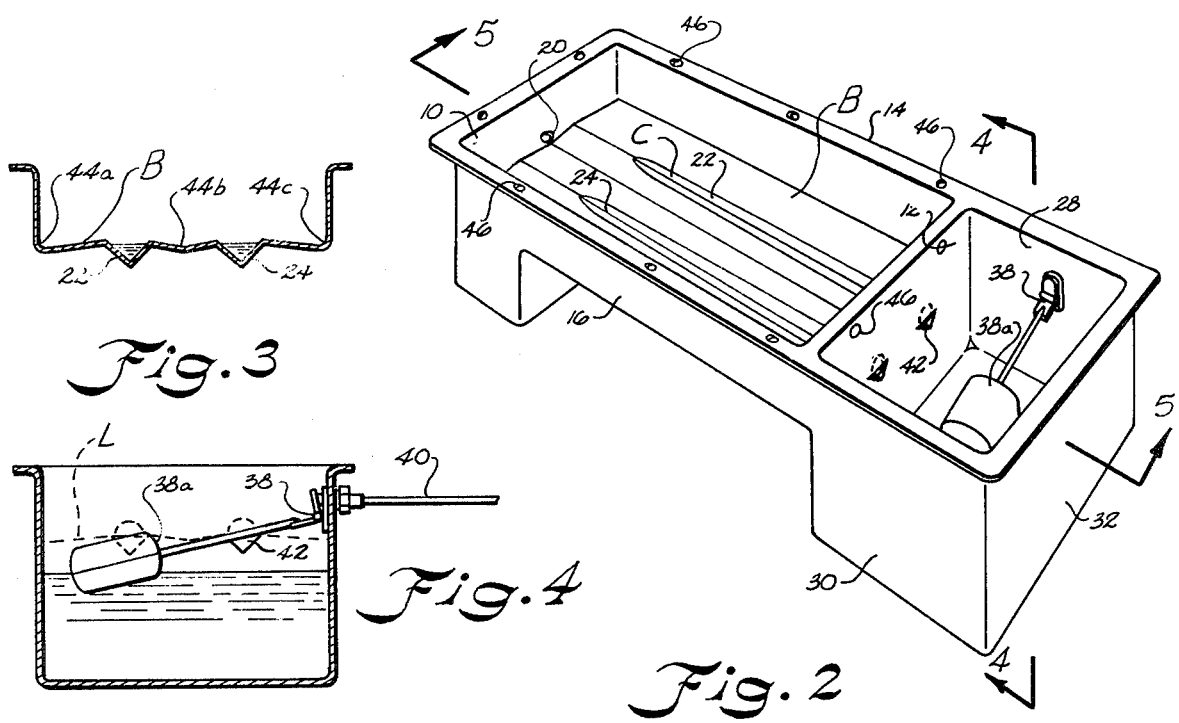
Fig. 3
Fig. 4
Fig. 2
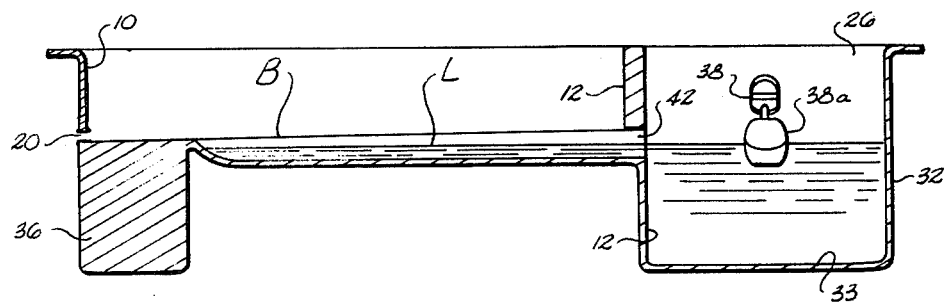
Fig. 5

HYDROPONIC BEDDING TRAY APPARATUS

BACKGROUND OF THE INVENTION

With the trend toward home gardening and the more efficient growth of vegetables, there has been an increasing interest in hydroponic systems wherein a plant is supported in an inert media and fed a nutrient solution whereby the growth cycle of the plant is controlled to assure the best possible plant and vegetable in appearance and taste while reducing the chance of disease and failure of the plant.

Heretofore, hydroponic systems have been proposed such as in U.S. Pat. Nos. 3,451,162 and 2,278,991, which disclose apparatus for home use wherein a nutrient solution is pumped from a reservoir to an inert media according to a timing sequence. However, such systems are primarily suitable for indoor use only and require electricity and attendant electrical wiring, and the use of artificial lighting and a pump.

It is an important object of the present invention to provide hydroponic apparatus for growing plants primarily outdoors but which may be used indoors as well.

Yet another important object of the present invention is to provide hydroponic apparatus which is simple and inexpensive which eliminates much of the hard work of home gardening such as weeding, digging, watering and the like, particularly for large plants such as tomatoes.

Yet another important object of the present invention is the provision of hydroponic apparatus which does not require the use of electricity and may be safely used outdoors.

Another important object of the present invention is the provision of hydroponic apparatus for growing plants in an inert media by feeding the plant a nutrient solution in an automatic manner wherein the apparatus may be utilized outdoors and provides for drainage of excessive rainwater and flushing of salts from a bedding tray without diluting the nutrient solution or upsetting the feeding routine of the plant.

SUMMARY OF THE INVENTION

It has been found that a hydroponic system and apparatus can be had for outdoor use by providing a bedding tray having a bottom floor which is inclined downwardly from a nutrient mixing reservoir to a drainage opening formed on the lower end thereof and by trough means carried below the bottom floor which is automatically filled to a predetermined level with a nutrient solution whereby the plants are fed through capillary action and drainage of excess water and flushing of salts occurs without substantially affecting the nutrient mixture in the reservoir and troughs.

BRIEF DESCRIPTION OF THE DRAWINGS

FIG. 1 is a perspective view illustrating hydroponic apparatus constructed according to invention;

FIG. 2 is a perspective view illustrating hydroponic apparatus constructed according to invention;

FIG. 3 is a sectional view taken along line 3—3 of FIG. 2;

FIG. 4 is a sectional view taken along line 4—4 of FIG. 2; and

FIG. 5 is a sectional view taken along line 5—5 of FIG. 2.

DESCRIPTION OF A PREFERRED EMBODIMENT

The drawing discloses a hydroponic plant growing apparatus wherein a plant is supported in a support media and fed a needed amount of a nutrient solution wherein the apparatus includes a bedding tray (A) having spaced end walls and spaced side walls extending between the end walls for containing the media. A bottom floor (B) is carried in the tray for supporting the media and the plant therein. Longitudinal nutrients supply trough means (C) is formed in the bottom floor which contains the nutrient solution and supplies the nutrient via capillary action to the plant through the media. A supply means is provided for maintaining a predetermined level of the nutrient solution in the trough means. The bottom floor (B) has a longitudinally sloping contour being inclined generally in the longitudinal direction of the trough means. Opening means formed in the bedding tray at an end wall thereof and towards which the bottom floor is inclined effectively provides for drainage of excess rainwater and the like out of the bedding tray to avoid excessive moisture conditions in the media and in a means which avoid dilution of the nutrient solution.

Referring now in more detail to the drawing, the hydroponic bedding tray includes a rectangular bed which, in one embodiment, measures approximately 4 feet in length, 22 inches in width, and is approximately 5 inches deep. The bed includes spaced end walls (10) and (12) with spaced side walls (14) and (16) extending therebetween providing a container for an inert plant supporting media (18). The bottom floor (B) integral with the end walls and side walls is inclined from end wall (12) downwardly toward end wall (10) facilitating drainage of excessive water outwardly from the media and container interior through opening means provided by outlet opening (20).

Longitudinal trough means (C) is provided in the form of a pair of parallel trough members (22) and (24) formed in the bottom floor (B) such as by molding. Supply means for maintaining a predetermined level of nutrient solution in the trough means (C) includes a nutrient mixing reservoir (26) integral with the bedding tray container and defined by end wall (12), side walls (28) and (30) and reservoir end wall (32). The reservoir is approximately 6 inches below the bottom floor of the bedding tray and provides a leg for supporting the bedding tray apparatus. Similarly, a leg (36) is molded or formed adjacent the end wall (10) which together with the reservoir leg supports the bedding tray in a level manner. The leg (36), while illustrated as solid, may also be molded or formed as a hollow leg. A conventional float valve (38) is carried by side wall (28) and provides a means for controlling the level of liquid and hence nutrient solution in the reservoir. Float valve (38) may be any suitable conventional float valve and may be connected by means of a conventional saddle clamp (not shown) and ¼" tubing (40) to a water line.

Troughs (22) and (24) are in fluid communication with the reservoir (26) by means of an opening (42) formed in end wall (12) such that the liquid in the trough means generally assumes the same level as in the reservoir. Troughs (22) and (24) are preferably of an inverted triangular cross section or rounded cross sectional shape whereby the open top of the trough grows progressively larger towards the open top thereof flush with bottom wall (B). In this manner, the rate at which the plant is fed via capillary action through the media may be controlled by controlling the level of liquid in the reservoir and hence in the troughs by means of adjusting the float valve (38). Thus, with the liquid level being higher or lower in the trough means, more or less liquid contact surface is presented to the media thus controlling the capillary action and feeding rate of the plant.

By sloping the bottom floor (B) of the bedding tray from the reservoir downwardly to the opening (20), excess water in the bedding tray such as from rain and the like will run downwardly from the reservoir to the opening (20) thus preventing dilution of the nutrient solution in the reservoir. As can best be seen in FIG. 3, the bottom floor (B) of the bedding tray is also provided with a laterally sloping contour such that the floor slopes away from each trough (22) and (24) whereby drainage of excess water will occur lengthwise along the floor in the depression areas (44a), (44b). Thus, the excess water drains away from the reservoir (26) avoiding dilution and drains laterally away from the troughs (22) and (24) to likewise avoid dilution of the nutrient solution and contamination therein. This drainage is beneficial in that it flushes excess salts which form and are deposited in the inert media (18) from the bedding tray container during rain and the like. In indoor hydroponic systems, it is often necessary to remove the media and wash it to remove the excess salts formed therein. In the present apparatus, which is particularly advantageous for outdoor use, the rain automatically flushes excess salts from the bedding tray container without affecting the nutrient solution or contaminating the solution in any significant way. Draining all water above the level of opening 20 also protects the root system of the plant from rotting.

It has been found that a slope of approximately $\frac{1}{8}''$ per foot for the bottom floor (B) is sufficient to drain water away from the reservoir toward the opening (20) in a manner to avoid dilution of the nutrient.

Openings (46) may be formed adjacent to upper edge of each of the side walls (14) and (16) and end walls (10) and (12) so that staking or other types of support can be attached to the bedding tray container to hold plants, such as tomato plants, and keep them from falling over. A lid (48) may also be provided to cover the reservoir (26) and prevent light from entering the reservoir so as to prevent the growth of algae.

In operation, the hydroponic bed works on the principle of capillary action. The water level (L) is maintained in the troughs (22) and (24) at a predetermined level so that proper capillary action is obtained. In the reservoir (26), a solution of dissolved nutrient is maintained which mixes with the water as it enters through the float valve (38). A given amount of the nutrient is mixed with the water in the reservoir to start the growth process of the plant supported in the media (18). This amount of nutrient is normally sufficient for about a period of six weeks at which time another given amount of nutrient is placed in a reservoir and is mixed therein as water enters into the reservoir through the float valve (38). Normally, the water level (L) is maintained at approximately $\frac{1}{2}$ of the height of the troughs (22) and (24) by setting the float (38a) of the float valve (38) at a corresponding height. Due to the rounded or V-shaped cross sectional configuration of the troughs, as the water level is raised or lowered, the area at the top of the water level will be more or less. This allows for more or less capillary action which in turn means that the wetness or dampness of the media may be controlled by controlling the level of the water or nutrient solution in the troughs. This is particularly beneficial since some plants require more wetness or moisture than others.

It is also important that the systems be set up level by noting the water in the troughs which should be level. After the unit is level, sand or any other media is then added to possibly 1" from the top of the bedding tray container. Other than the addition of nutrient to the reservoir two or three times during the growing season, the unit is completely automatic and takes care of itself. There is no requirement for electricity, timing controls, pumps, or artificial lighting.

Thus, it can be seen that an advantageous construction can be had for hydroponic bedding tray and feeding apparatus which may be utilized outdoors in a completely automatic and safe manner wherein no pumps, timers, or electricity is needed as the present systems on the market utilize. Any number of beds can be hooked up to the same water line tubing so that actually the bedding tray apparatus may be utilized commercially. The apparatus provides a very simple and inexpensive hydroponic system for growing vegetables, fruits, or ornamental plants. Although the apparatus has particular advantages for outdoor use, the same may be used indoors as well.

While a preferred embodiment of the invention has been described using specific terms, such description is for illustrative purposes only, and it is to be understood that changes and variations may be made without departing from the spirit or scope of the following claims.

What is claimed is:

1. Hydroponic plant growing apparatus wherein a plant is supported in a support media and fed a metered amount of a nutrient solution, said apparatus comprising:
    a bedding tray having spaced end walls and spaced side walls extending between said end walls for containing said media;
    a bottom floor carried in said tray for supporting said media and plant therein;
    longitudinal nutrient supply trough means formed in said bottom floor containing said nutrient solution and supplying said nutrient via capillary action to said plant through said media;
    supply means for maintaining a predetermined level of said nutrient solution in said trough means;
    said bottom floor having a longitudinally sloping contour being inclined generally in the longitudinal direction of said trough means; and
    opening means formed in said bedding tray adjacent an end wall thereof toward which said bottom floor is inclined whereby rain water and the like is effectively drained out of said bedding tray in a manner avoiding dilution of said nutrient solution.

2. The apparatus of claim 1 wherein said supply means includes a nutrient liquid supply reservoir in fluid communication with said trough means whereby the level of liquid in said reservoir is generally maintained in said trough means at said predetermined level, and valve means for maintaining said liquid level at a predetermined level in said reservoir.

3. The apparatus of claim 1 wherein said bottom floor includes a laterally sloping portion being inclined downwardly away from said trough means facilitating drainage longitudinally along said bottom floor in a manner avoiding drainage into said trough means.

4. The apparatus of claim 1 wherein said trough means includes a bottom floor inclined to said bottom floor of said bedding tray.

5. The apparatus of claim 1 wherein said level of said nutrient solution is maintained in said trough means below the level of said bedding tray bottom floor.

6. The apparatus of claim 1 wherein said supply means includes a liquid reservoir for containing said nutrient solution integral with said bedding tray, said trough means opening at one end thereof into said reservoir, and valve means controlling the level of liquid in said reservoir and hence said trough means.

7. The apparatus of claim 1 wherein said trough means includes at least two open-top troughs formed in said bedding tray bottom floor and a top of said troughs being open flush with said floor.

8. The apparatus of claim 1 wherein said supply means includes a liquid reservoir in fluid communication with said trough means for containing said nutrient solution, said bottom floor of said bedding tray being inclined downwardly from adjacent said reservoir toward said opening means whereby excess rainwater and the like is properly drained to avoid dilution of said nutrient solution.

9. The apparatus of claim 1 wherein said trough means includes at least one trough carried in said bedding tray bottom floor having an open top flush with said bottom floor, said trough having a cross section shape diverging outwardly toward said open-top to provide a progressively larger opening whereby said capillary action may be controlled by controlling said liquid level in said trough and hence the water contact surface area.

* * * * *